(12) United States Patent
Aoki

(10) Patent No.: US 7,978,348 B2
(45) Date of Patent: Jul. 12, 2011

(54) IMAGING DEVICE

(75) Inventor: Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1175 days.

(21) Appl. No.: 10/899,055

(22) Filed: Jul. 27, 2004

(65) Prior Publication Data

US 2005/0024669 A1 Feb. 3, 2005

(30) Foreign Application Priority Data

Jul. 28, 2003 (JP) .................. 2003-281057

(51) Int. Cl.
*G06F 1/12* (2006.01)
*G06F 3/12* (2006.01)
*G06F 17/00* (2006.01)
*H04N 1/46* (2006.01)
*G06Q 30/00* (2006.01)
*G03G 21/02* (2006.01)
*G03G 15/00* (2006.01)

(52) U.S. Cl. ...... 358/1.13; 358/515; 358/1.15; 705/400; 705/14; 705/26; 399/79; 399/8

(58) Field of Classification Search ............... 399/8, 79; 705/29, 14, 26, 400; 358/1.13, 515, 1.15
See application file for complete search history.

(56) References Cited

U.S. PATENT DOCUMENTS

| 4,583,116 | A | * | 4/1986 | Hennig et al. | 358/515 |
|---|---|---|---|---|---|
| 5,383,129 | A | * | 1/1995 | Farrell | 399/79 |
| 6,064,838 | A | * | 5/2000 | Maruta et al. | 399/79 |
| 6,516,157 | B1 | * | 2/2003 | Maruta et al. | 399/8 |
| 6,714,314 | B1 | | 3/2004 | Ueda | |
| 6,975,414 | B2 | * | 12/2005 | Nagatomi et al. | 358/1.13 |
| 7,024,339 | B1 | * | 4/2006 | Bhaskar et al. | 702/185 |
| 7,123,367 | B1 | * | 10/2006 | Kanaya et al. | 358/1.13 |
| 2001/0037267 | A1 | * | 11/2001 | Sato et al. | 705/29 |
| 2002/0089683 | A1 | * | 7/2002 | Moro et al. | 358/1.13 |
| 2002/0147646 | A1 | * | 10/2002 | Ogura et al. | 705/14 |
| 2002/0165833 | A1 | * | 11/2002 | Minowa et al. | 705/400 |
| 2003/0020951 | A1 | * | 1/2003 | Minowa et al. | 358/1.15 |
| 2003/0072022 | A1 | * | 4/2003 | Someno | 358/1.13 |
| 2003/0093324 | A1 | * | 5/2003 | Simpson et al. | 705/26 |

FOREIGN PATENT DOCUMENTS

| JP | A 4-338767 | 11/1992 |
|---|---|---|
| JP | A 9-138621 | 5/1997 |
| JP | A-09-160452 | 6/1997 |
| JP | A 11-84963 | 3/1999 |
| JP | A-2000-019906 | 1/2000 |

(Continued)

*Primary Examiner* — Chan S Park
*Assistant Examiner* — Akwasi M Sarpong
(74) *Attorney, Agent, or Firm* — Oliff & Berridge, PLC

(57) ABSTRACT

An imaging device capable printing images in a plurality of print modes includes an image storage, a print mode data storage that stores a plurality of pieces of print mode data corresponding to the plurality of print modes, a consumable substance quantity calculating system that calculates quantity of consumable substances necessary for printing images in accordance with image data stored in the image storage, a print cost calculating system that calculates, for each of the plurality of print modes, a print cost based on the quantity of the consumable substances calculated by the consumable substance quantity calculating system. The print costs corresponding to the plurality of print modes are displayed in association with the plurality of print modes, and a printing system executes a printing operation in a designated print mode in accordance with the image data stored in the image storage.

13 Claims, 8 Drawing Sheets

FOREIGN PATENT DOCUMENTS

| | | |
|---|---|---|
| JP | A-2000-137562 | 5/2000 |
| JP | A 2000-298418 | 10/2000 |
| JP | A-2002-268861 | 9/2002 |
| JP | A-2003-114596 | 4/2003 |
| JP | A-2003-150009 | 5/2003 |
| JP | A-2004-177736 | 6/2004 |

* cited by examiner

FIG. 3

| OP# | MODE | COST |
|---|---|---|
| 1 | NORMAL | ¢10 |
| 2 | MONOCHROMATIC | ¢3 |
| 3 | 70% INK QUANTITY | ¢7 |
| 4 | 50% INK QUANTITY | ¢5 |
| 5 | 100% BLACK/70% COLOR | ¢8 |
| 6 | 100% BLACK/50% COLOR | ¢6 |
| 7 | 70% MONOCHROMATIC | ¢2 |
| 8 | 50% MONOCHROMATIC | ¢1 |

0 ... CANCEL

| MODE # | MODE NAME | MONOCHROMATIZE | WEIGHTING FACTOR (BLACK) | WEIGHTING FACTOR (COLOR) |
|---|---|---|---|---|
| 1 | NORMAL | NO | 100% | 100% |
| 2 | MONOCHROMATIC | YES | 100% | – |
| 3 | 70% INK QUANTITY | NO | 70% | 70% |
| 4 | 50% INK QUANTITY | NO | 50% | 50% |
| 5 | 100% BLACK/70% COLOR | NO | 100% | 70% |
| 6 | 100% BLACK/50% COLOR | NO | 100% | 50% |
| 7 | 70% MONOCHROMATIC | YES | 70% | – |
| 8 | 50% MONOCHROMATIC | YES | 50% | – |

FIG. 4

IMAGING DEVICE

BACKGROUND OF THE INVENTION

The present invention relates to an imaging device having a plurality of print modes selectable by a user.

Conventionally, as an imaging device, a copier, a printer and a facsimile device as an individual device or a multi-functional device having two or three of such functions. Such a device generally implemented with a plurality of print modes (e.g., a normal print mode and an economical print mode) having different toner (or ink) consumption properties.

An example of such a device is disclosed in Japanese Patent Provisional Publication No. HEI 9-138621. According to a device disclosed therein, a user firstly sets a print mode, and then the device provides an estimation of a print cost when the printing is performed in the set print mode taking a toner consumption for the set mode into account.

Depending on the image to be printed, the consumed quantities of toner may not be so different regardless of the selected print mode (e.g., the normal mode or the economical mode). In such a case, it is preferable to use the normal mode since it provides an image at higher quality.

According to the convention imaging device as disclosed in the publication, in order for the user to select the appropriate print mode, the user is required to repeatedly execute an operation of selecting one of the print modes available, and check the print cost indicated by the imaging device. Only after all the print costs corresponding to all the print modes are checked, the user can select the appropriate print mode. Therefore, according to the conventional device, in order to find the appropriate print mode from among a plurality of print modes, a troublesome work is required, which is also time-consuming work.

SUMMARY OF THE INVENTION

The present invention is advantageous in that the user can select an appropriate print mode from among a plurality of print modes easily and quickly.

According to an aspect of the invention, there is provided an imaging device capable printing images in a plurality of print modes, which is provided with an image storage that stores image data subject to be printed, a print mode data storage that stores a plurality of pieces of print mode data corresponding to the plurality of print modes, a consumable substance quantity calculating system that calculates quantity of consumable substances necessary for printing images in accordance with the image data stored in the image storage, a print cost calculating system that calculates, for each of the plurality of print modes, a print cost based on the quantity of the consumable substances calculated by the consumable substance quantity calculating system, a displaying system that displays the print costs corresponding to the plurality of print modes calculated by the print cost calculating system in association with the plurality of print modes, a designating system that allows a user to designate one of the plurality of print modes displayed by the displaying system, and a printing system that executes a printing operation in the designated print mode in accordance with the image data stored in the image storage.

Optionally, each piece of the print mode data may include weighting factor information defining the quantity of the consumable substances to be used in the corresponding print mode.

In a particular case, the printing system is configured to print a color image consisting of black print dots and color print dots. In such a case, the weighting factor information may include a black dot weighting factor defining the quantity of the consumable substances used for forming black print dots and a color dot weighting factor defining the quantity of the consumable substances used for forming color print dots.

Further, in the above case, the imaging device may include a print mode data setting system that allows a user to arbitrarily set the weighting information.

Optionally, the imaging device may be provided with a print mode data setting system that allows a user to arbitrarily set the print mode data.

Still optionally, if the image data stored in the image storage includes a plurality of pages of image data, the consumable substance quantity calculating system may calculate a total quantity of the consumable substances necessary of all the plurality of pages of image data, and the print cost calculating system may calculate the print cost for each of the plurality of print modes based on the total quantity calculated by the consumable substance quantity calculating system.

Further optionally, the imaging device may include a scanning system that scans an image on an original to output image data, the image data output by the scanning system being stored in the image storage, and a scanning control system that controls the scanning system to scan an image while the printing system is executing the printing operation.

Still optionally, the imaging device may include a minimum cost selecting system that automatically selects the print mode corresponding to the lowest one of the print costs calculated by the print cost calculating system.

Further, when the consumable substances may be contained in at least one cartridge, the print cost calculating system may calculate the print costs taking the price of the at least one cartridge into account. In such a case, the imaging device may include a cartridge price inputting system that allows a user to input a price of the at least one cartridge.

According to another aspect of the invention, there is provided an imaging device capable printing images in a plurality of print modes, which is provided with an image storage that stores image data subject to be printed, a print cost calculating system that calculates print costs for the plurality of print modes, respectively, a displaying system that displays the print costs corresponding to the plurality of print modes calculated by the print cost calculating system in association with the plurality of print modes, a designating system that allows a user to designate one of the plurality of print modes displayed by the displaying system, and a printing system that executes a printing operation in the designated print mode in accordance with the image data stored in the image storage.

According to a further aspect of the invention, there is provided a computer program product including computer readable instructions that cause a computer to function as an imaging device capable printing images in a plurality of print modes, the imaging device having functions of an image storage that stores image data subject to be printed, a print mode data storage that stores a plurality of pieces of print mode data corresponding to the plurality of print modes, a consumable substance quantity calculating system that calculates quantity of consumable substances necessary for printing images in accordance with the image data stored in the image storage, a print cost calculating system that calculates, for each of the plurality of print modes, a print cost based on the quantity of the consumable substances calculated by the consumable substance quantity calculating system, a displaying system that displays the print costs corresponding to the plurality of print modes calculated by the print cost calculating system in association with the plurality of print modes, a designating system that allows a user to designate one of the plurality of print modes displayed by the displaying system, and a printing system that executes a printing operation in the designated print mode in accordance with the image data stored in the image storage.

BRIEF DESCRIPTION OF THE ACCOMPANYING DRAWINGS

FIG. 3 shows a table displayed on an LCD (liquid crystal display) of the MFP;

FIG. 4 is a table showing a structure of data stored in a print mode memory;

DETAILED DESCRIPTION OF THE EMBODIMENT

Referring to the accompanying drawings, an MFP (multi-functional peripheral) according to an embodiment of the invention will be described.

Figure 1:
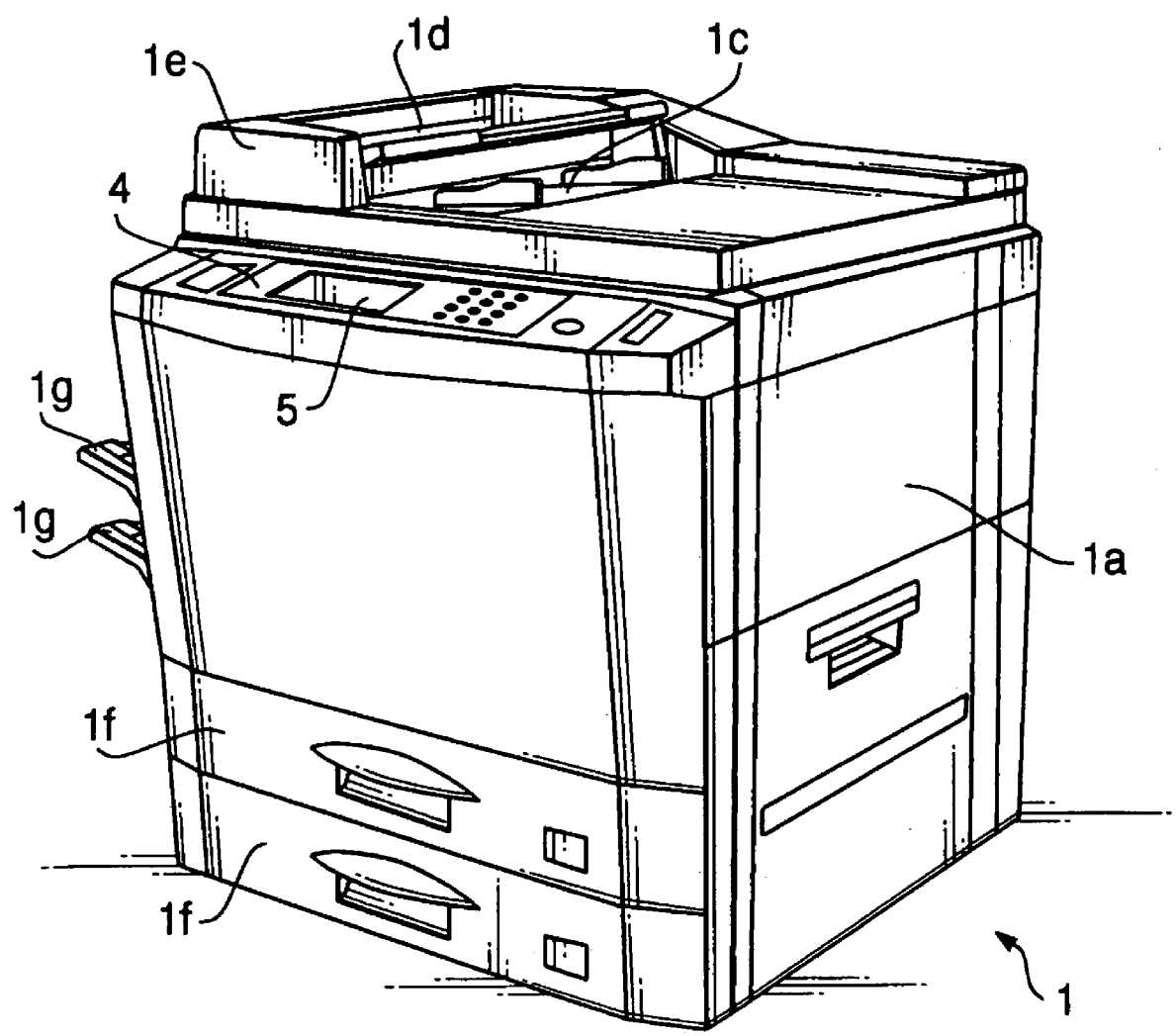
FIG. 1 is a perspective view of an MFP (multi-functional peripheral) according to an embodiment of the invention.

FIG. 1 shows a perspective view showing an appearance of the MFP 1 according to the embodiment. The MFP 1 shown in FIG. 1 is wire-connected to a public telephone line network (not shown) provided by a communication carrier through a telephone line. In this embodiment, the MFP 1 is configured to have a facsimile communication function for transmitting/receiving digitized image data, a scanner function for optically reading an original and creating digitized image data (scanned image), a copier function for scanning an image using the scanner function and forming the image on a recording medium, and a printer function for printing an image in accordance with print data transmitted from a personal computer (PC).

On an upper front portion of a main body 1a of the MFP 1, an operation panel 4 is provided. The operation panel 4 includes an economical mode button 4a, a cartridge price input button 4b, a print mode data setting button and ten keys 4d and an LCD (liquid crystal display) 5. The LCD 5 is a display for displaying an operation currently performed and a communication condition regarding a communication with a PC 35 connected with the MFP 1 or a communication with another device connected via a telephone line 26 (see FIG. 2). When the MFP 1 is operated through the command input keys provided on the operation panel 4, the operational status and operational procedures are displayed on the LCD 5. Further, a touch panel is provided to the LCD 5. Command input buttons are displayed on the LCD 5, and a user can input commands by touching the command input buttons through the touch panel.

On a top surface of the main body 1a, an original feeder 1e having an original inlet 1c and an original outlet 1d is provided. The original to be copied is inserted from the original inlet 1c with its image carrying surface directed downward. The original inserted in the original inlet 1c is fed, by the original feeder 1e, to the image scanning unit of the MFP 1. After the image formed on the original is scanned by a scanner (e.g., CCD line sensor) 22 provided inside the MFP 1, the original is discharged from the original outlet 1d.

At a lower portion of the main body 1a, a sheet feed trays 1f which mount a plurality of types of recording sheets, and is configured to drawable with respect to the main body 1a are provided. From the sheet feed trays 1f, a recording sheet on which the scanned image is printed, is supplied inside the main body 1a as a sheet feed motor is driven. The recording sheet on which the image is printed is discharged from the main body 1a through recording sheet outlets 1g formed on the side surface of the MFP 1.

Figure 2:
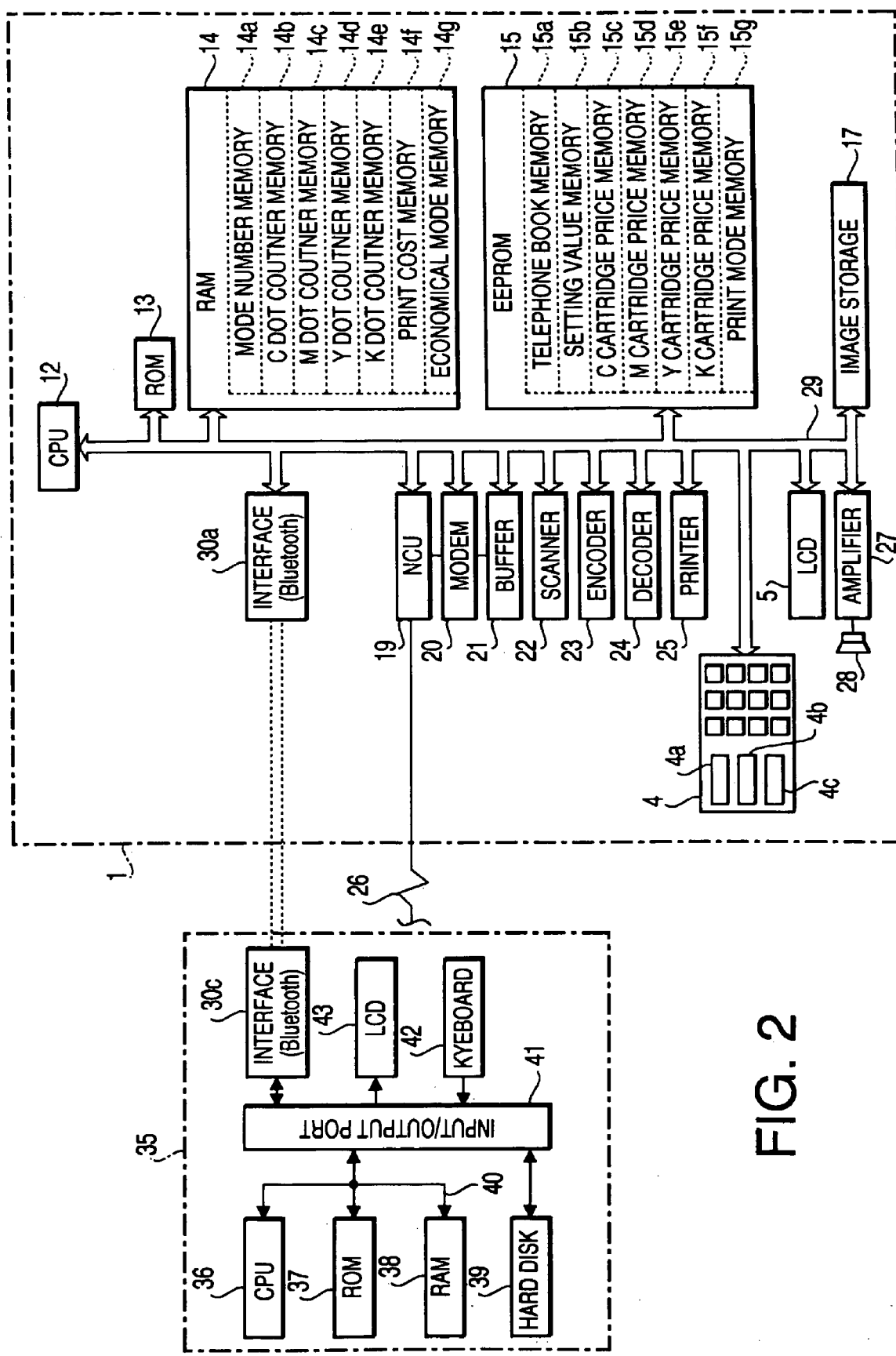
FIG. 2 is a block diagram showing electrical configuration of the MFP and an external device connected to the MFP.

FIG. 2 is a block diagram showing an electric configuration of the PFP 1 and the PC 35.

As shown in FIG. 2, the MFP 1 has a CPU 12, a ROM 13, a RAM 14, an EEPROM 15, an image storage 17, a network control unit (NCU) 19, a modem 20, a buffer 21, the scanner 22, an encoder 23, a decoder 24, a printer 25, the operational panel 4, the LCD 5, an amplifier 27 and an interface 30a, which are interconnected through a bus line 29.

The NCU 19 is for the line control, and the MFP 1 is connected to the telephone line 26 through the NCU 19. The NCU 19 receives the ringing tone signal and various other signals transmitted from an exchanger through the telephone line 26. The NCU 19 further operates to transmit dialing signals corresponding to the operation through the input keys of the operation panel 4. When the telephone line 26 is closed (i.e., the connection is established), the NCU 19 can also operate to transmit/receive facsimile data.

The CPU 12 executes the facsimile transmission operation, printing operation and the like by controlling respective components connected to the bus line 29, in accordance with the signals transmitted through the NCU 19. The ROM 13 is a non-volatile read-only memory storing control programs to be executed by the MFP 1. It should be noted that the procedures shown in FIGS. 5-8 are stored in the ROM 13 as programs to be executed by the CPU 12.

The control programs are for controlling various operations performed by the MFP 1, which include the facsimile transmission operation, printing operation and data communication between the MFP 1 and the PC 35. In particular, the control programs include printing procedure, cost estimating procedure, cartridge price determining procedure and print mode setting procedure.

The RAM 14 temporarily stores various data and includes mode number memory 14a, C dot counter memory 14b, M dot counter memory 14c, Y dot counter memory 14d, K dot counter memory 14e, print cost memory 14f and economical mode flag 14g.

The mode number memory 14a is a memory that stores the number of print modes whose print mode data is stored in a print mode memory 15g, which will be described later.

The C dot counter memory 14b, M dot counter memory 14c, Y dot counter memory 14d and K dot counter memory 14e respectively store the numbers of dots (pixels) of the color components which would be used if the image data stored in the image storage 17 is printed according to the normal print mode.

Figure 6:
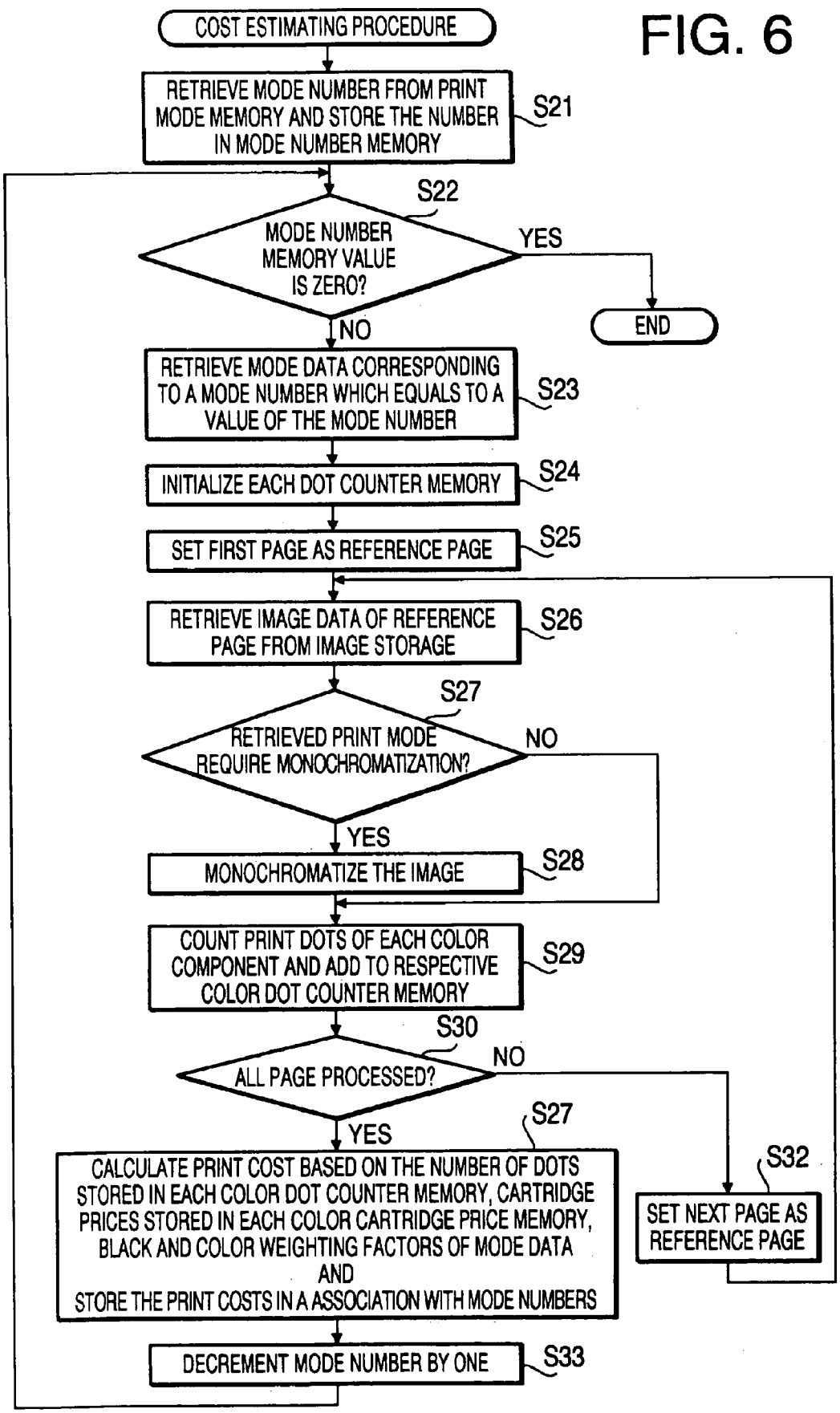
FIG. 6 is a flowchart illustrating a cost estimating procedure executed in the MFP.

Each of the C dot counter memory M dot counter memory 14c, Y dot counter memory 14d and K dot counter memory 14e is initialized to have a value zero when the cost estimating procedures shown in FIG. 6 is started. Then, when the number of dots for each color component necessary for printing one page of image data is calculated in the procedure, each counter memory is updated as the calculated number of dots is accumulatively added.

The print cost for printing the image data stored in the image storage 17 is calculated based on:
- the number of print dots of respective color components stored in the C dot counter memory 14b, M dot counter memory 14c, Y dot counter memory 14d and K dot counter memory 14e;
- black weighting values and color weighting values for the print mode data stored in the print mode memory 15g (described later); and
- prices of respective ink cartridges stored in C cartridge price memory 15c, M cartridge price memory 15d, Y cartridge price memory 15e and K cartridge price memory 15f.

The print cost memory 14f is a memory that stored the print costs for respective print modes in association to the mode numbers of respective print modes.

The economical mode flag 14g represents whether the economical mode is selected. The economical mode is a print mode in which a print mode with the lowest print cost is automatically selected from among the plurality of print modes, and printing is executed in the selected mode. As the user depresses the economical mode button 4a, the economical mode flag 14g is switched between ON and OFF.

The EEPROM 15 is a rewritable non-volatile memory. The data stored in the EEPROM 15 is retained after the EEPROM 15 is powered off. The EEPROM 15 typically stores various data and setting values set/registered by an operator. In this example, the EEPROM 15 includes a telephone book memory 15a and setting value memory 15b. The MFP 1 is configured such that, by a predetermined operation, a data input screen for allowing the operator to input various data and setting values is displayed on the LCD 5. The data/settings input through the input screen are stored in the telephone book memory 15a and the setting value memory 15b.

The telephone book memory 15a stores facsimile numbers of destination facsimile devices. The data stored in the telephone book memory 15a is retrieved when the facsimile transmitting operation is executed.

The setting value memory 15b generally stores setting values necessary when the wireless communication is performed between the MFP 1 and the PC 35. The data communication between the MFP 1 and the PC 35 is executed wirelessly, using electromagnetic wave. Therefore, a security measure for preventing eavesdropping is necessary. That is, when the wireless communication is executed, it is set that the communication can be performed only between the MFP 1 and the PC 35. Setting values for this restricted communication are stored in the setting value memory 15b. When the wireless communication is performed, the setting values stored in the setting value memory 15b are referred to.

Specifically, the setting values stored in the setting value memory 15b include channels of the interfaces 30a and 30c, and Extended Service Set IDs (hereinafter, simply referred to as ESSID). The channel is a path of data, which is invisible, and when the mutual communication is achieved, the interfaces 30a and 30c are set to use the same channel. Therefore, the channel of the MFP 1 and that of the PC 35 are set to the same channel, and the value is stored as the set value in the setting value memory 15b. In the wireless network system, the ESSID is a character string to be used for identifying individual network. The ESSID is set by the user, and assigned to each device.

The C cartridge price memory 15c, M cartridge price memory 15d, Y cartridge price memory 15e and K cartridge price memory 15f are memories storing the C (cyan), M (magenta), Y (yellow) and K (black) ink cartridges, respectively. Default values are stored in the C cartridge price memory 15c, M cartridge price memory 15d, Y cartridge price memory 15e and K cartridge price memory 15f at the time of shipment from the factory. The values in the cartridge price memories can be changed during a cartridge price determining procedure shown in FIG. 7, which will be described in detail later.

The print mode memory 15g is a memory for storing a plurality of pieces of print mode data which correspond to a plurality of print modes. FIG. 4 shows a table 40 stored in the print mode memory 15g.

As shown in FIG. 4, the table 40 stores, for each of a normal mode, a black and white mode, 70% ink quantity mode, 50% ink quantity modes, 100% black and 70% color mode, 100% black and 50% color mode and 70% monochromatic mode, 50% monochromatic mode, a mode number, a mode name, whether converted into monochromatic image, the black weighting value, the color weighting value are stored as print mode data.

Figure 8:
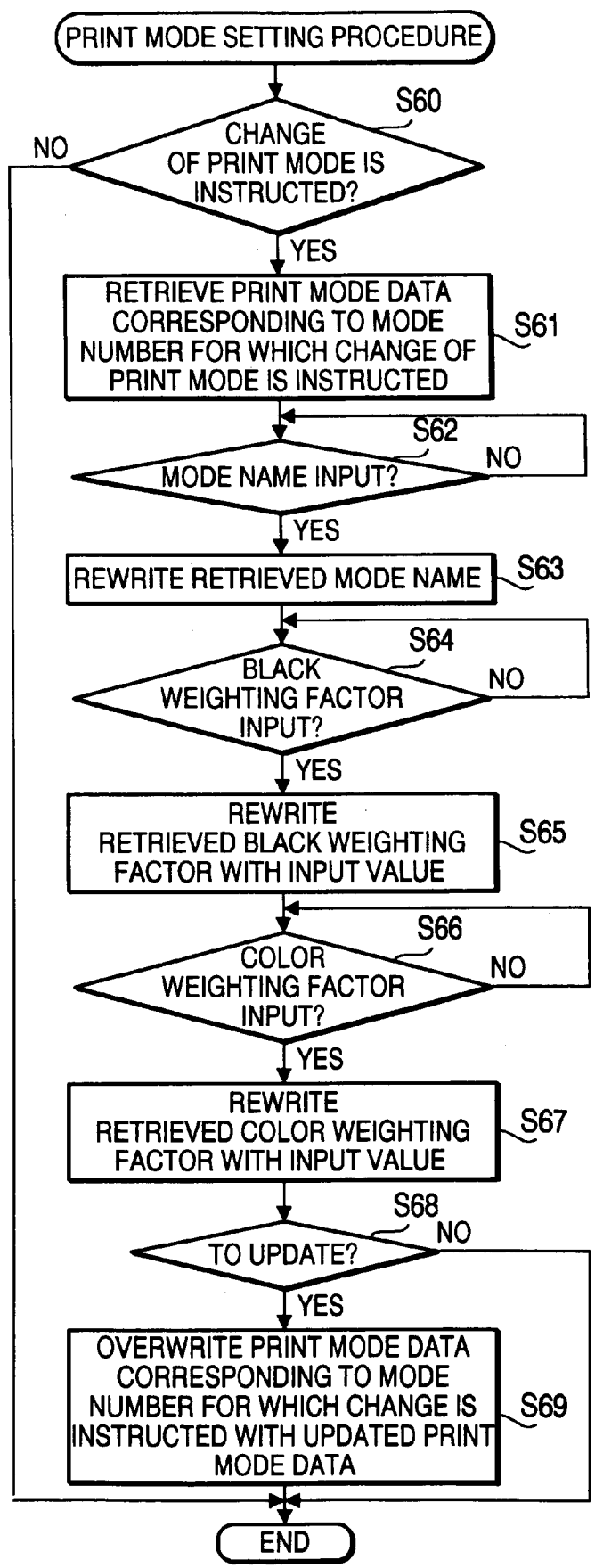
FIG. 8 is a flowchart illustrating a print mode setting procedure executed in the MFP.

The mode names, black weighting values and color weighting values stored in the print mode memory 15g can be rewritten during the print mode setting procedure shown in FIG. 8. Further, by operating the operation panel 4, a new print mode can be registered with the print mode memory 15g and an existing print mode can be deleted. When a print mode is selected during the printing procedure shown in FIG. 5 (described later), the print mode data corresponding to the selected print mode is retrieved from the table 40, ant the printing procedure by the printer 25 is executed based on the retrieved print mode data.

The image storage 17 is for storing the entire image data. In the embodiment, the image storage 17 is constituted by a DRAM having a large capacity. In the MFP 1, when the facsimile data is received, it is temporarily stored in the image storage 17, and then, when the printer 25 can operate to print, transmitted to the printer 25. After printer by the printer 25, the facsimile data store din the image storage 17 is deleted. When the facsimile data is the image data, the size is generally large. However, the facsimile data is deleted when it is printed out. Therefore, the capacity of the image storage 17 is efficiently utilized. Further, in the image storage 17, the image data input through the PC 35 is also stored as image data files. In this case, the image data files are remained in the image memory, until a predetermined deleting operation is performed.

The modem 20 transmits/receives the image data as encoded/decoded data, and further transmits/receives various procedure signals for transmission control. The buffer 21 temporarily stores encoded facsimile data which is exchanged between another facsimile device.

The scanner 22 is for scanning the image of the originally inserted through the original inlet 1c. The encoder 23 encodes the scanned image of the original read by the scanner 22. The decoder 24 is for retrieving the received data stored in the buffer 21, and decodes the same. The decoded data is printed by the printer 25 on the recording sheet. The operation panel 4 is used for various operation such as the settings/operations of the MFP 1. The amplifier 27 amplifies audio signals input thereto to sound the speaker 28. For example, a ringing tone is output by the speaker.

The interfaces 30a and 30c are for connecting the MFP 1 and the PC 35. The interfaces 30a and 30c defines connection standards for data communication between different devices, and electrical configurations are defined thereby. According to the embodiment, the interfaces 30a and 30c employs a general use wireless communication standard know as Bluetooth. The Bluetooth is the interface utilizing the 2.45 GHz electromagnetic wave which can be used without license and allows the data communication at the speed of 1 Mbps. The Bluetooth requires a relatively low power consumption and manufacturing cost can be suppressed. Further, when a distance between the devices is 10 meters or smaller, the data communication can be performed even if there is an obstacle therebetween.

The PC 35 is a personal computer, and performs the data communication with the MFP 1. The PC 35 can transmit the data the PC 35 contains or input to the PC 35 to the MFP 1. Further, the PC 35 can receive the data transmitted from the MFP 1 and process the received data.

The PC 35 includes a CPU 36, a ROM 37, a RAM 38, a hard disk 39, an input/output port 41, a keyboard 42, an LCD 43 and an interface 30c, which are interconnected through a bus line 40.

The CPU 36 control each component connected through the bus line 40 based on the parameters stored in the ROM 37, transmitted/received by executing programs stored in the ROM 37 and/or transmitted/received signals through the interface 30c. The ROM 37 is a non-volatile non-rewritable memory and contains control programs to be executed in the PC 35. The RAM 38 is a memory for temporarily storing data.

The hard disk 39 is a non-volatile writable storage, and various data and programs, which may be installed when necessary, are stored therein. Specifically, programs stored in the hard disk 39 include programs for transmitting the data created in the PC 35 to the MFP 1, and programs for receiving and processing image data transmitted form the MFP 1.

The keyboard 42 is an input device provide with a plurality of keys, which are depressed and various alphanumeric characters assigned to respective keys are input. The input characters are displayed on the LCD 43.

The interface 30c complies with the same standard as that for the interface 30a of the MFP 1. Specifically, the interface 30c employs the Bluetooth standard. Through the interface 30c, the PC 35 is connected to the MFP 1, and the PC 35 can receive the image data from the MFP 1. The received data is stored in the RAM 38, and is displayed on the LCD 43 when a predetermined output operation is performed.

As shown in FIG. 2, the CPU 36, the ROM 37 and the RAM 38 are interconnected through the bus line 40, and the bus line 40 is connected to the input/output port 41. The input/output port 41 is also connected to the hard disk 39, keyboard 42, LCD 43 and the interface 30c.

Next, procedures of the MFP 1 configured as above will be described with reference to flowcharts shown in FIGS. 5-8.

Figure 5:
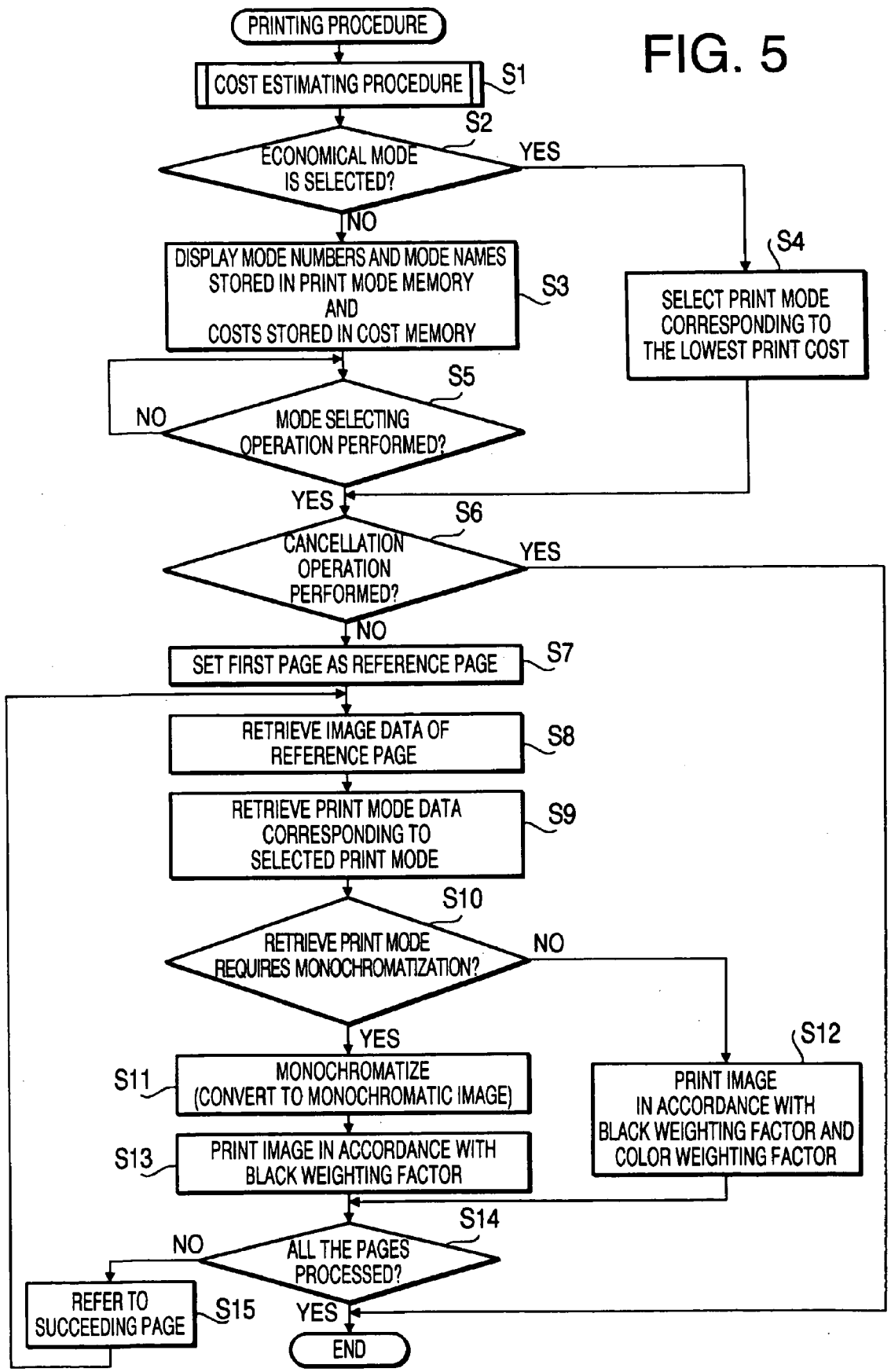
FIG. 5 is a flowchart illustrating a printing procedure executed in the MFP.

FIG. 5 shows a flowchart illustrating the printing procedure. The printing procedure is executed at a timing when the image data scanned by the scanner 22, facsimile data transmitted from some other facsimile device or image data transmitted from the PC 35 is stored in the image storage 17.

When the printing procedure shown in FIG. 5 is started, the cost estimating procedure shown in FIG. 6 is called first. Therefore, the cost estimating procedure will be described refereeing to FIG. 6.

In the cost estimating procedure, the number of the print modes of which the print mode data is stored in the print mode memory 15g is detected and stored in the mode number memory 14a. For example, when the print mode memory 15g stores the table 40 shown in FIG. 4, the number of lines of the table 40 (i.e., eight) is stored in the mode number memory 14a (S21).

Next, process determines whether the value of the mode number memory 14a is zero (S22). When the value of the mode number memory 14a is not zero (S22: NO), process retrieves n-th print mode data from the table 40 stored in the print mode memory 15g, n being the value of the mode number memory 14a. For example, when the value of the mode number memory 14a is eight (8), the print mode data at the mode number of 8 in the table 40 shown in FIG. 4 is retrieved (S23).

Next, process stores zero (0) in C dot counter memory 14b, M dot counter memory 14c, Y dot counter memory 14d and K dot counter memory 14e (S24).

In S25, part of the image data stored in the image storage 17 and corresponding to the first page is set as a reference page, and the image data of the reference page is retrieved in a predetermined area of the RAM 14 (S26).

Next, process examines the print mode data retrieved in S23 to determine whether the print mode data is for monochromatizing the image (i.e., converting the image into monochromatic image) (S27). For example, when the monochromatic mode, 70% monochromatic mode or 50% monochromatic mode indicated in table 40 of FIG. 4 is retrieved, process determines that the print mode data is for converging the image into monochromatic image (S27: YES), the image data retrieved in S26 is binarized so as to be monochromatized. Then, process proceeds to S29.

When the print mode data retrieved in S23 is the normal mode, 70% quantity ink mode, 50% quantity ink mode, 100% black/70% color mode or 100% black/50% color mode, the print mode does not monochromatize the image (S27: NO), S28 is skipped and process proceeds to S29.

In S29, process examines the retrieved image data to count the number of dots of each of the C, M, Y and K color components and accumulatively store the counted values in the C dot counter memory 14b, M dot counter memory 14c, Y dot counter memory 14d and K dot counter memory 14e.

When the numbers of print dots for the first page are counted, the numbers are stored as they are in the C dot counter memory 14b, M dot counter memory 14c, Y dot counter memory 14d and K dot counter memory 14e. When the numbers of print dots for the second page or later are counted, the numbers are accumulated (added) to the values stored in the C dot counter memory 14b, M dot counter memory 14c, Y dot counter memory 14d and K dot counter memory 14e, respectively. Thus, in the C dot counter memory 14b, M dot counter memory 14c, Y dot counter memory 14d and K dot counter memory 14e, the sum of the numbers of the print dots in the image data having been retrieved are stored.

Next, process determines whether the retrieval of the image data has been completed for all the pages of the image data stored in the image storage 17 (S30). When all the pages of image data have not been retrieved (S30: NO), the succeeding page is set to as the reference page (S32), and the image data of the reference page (i.e., the next page) is retrieved from the image memory 17 (S26). When all the pages of the image data stored in the image storage 17 have been processed (S30: YES), the print cost is calculated in accordance with equation (1), and the print cost is stored in association to the mode number in the print cost memory.

$$\text{Cost} = Nk \times Pk \times Wk/100 + (Nc \times Pc + Nm \times Pm + Ny \times Py) \times Wc/100 \quad (1)$$

where, Nk represents the value of the K dot counter, Pk represents the unit price for one black dot, Wk represents a black weighting factor, Nc represents the value of the C dot counter, Pc represents the unit price for one cyan dot, Nm represents the value of the M dot counter, Pm represents the unit price for one magenta dot, Ny represents the value of the Y dot counter, Py represents the unit price for one yellow dot, and Wc represents a color weighting factor.

In the equation (1), the unit price of the black dot is a cost for printing a one normal black dot. In practice, the unit price of the black dot is calculated by dividing the value stored in the K cartridge price memory 15$f$ (i.e., the price of the black ink cartridge: approximately 20 dollars) with the number of dots (e.g., $442 \times 10^6$ dots) printable with the ink contained in the black ink cartridge. In this case, the unit price is $4.5 \times 10^{-6}$ cents. Similarly, the unit price of the C (cyan) dot is calculated by dividing the value stored in the C cartridge price memory 15$c$ (i.e., the price of the black ink cartridge: approximately 10 dollars) with the number of dots (e.g., $233 \times 10^6$ dots) printable with the ink contained in the cyan ink cartridge. In this case, the unit price is $4.3 \times 10^{-6}$ cents. The unit price of the M (magenta) dot and the unit price of the Y (yellow) dot can be calculated in the similar manner, based on the prices of the ink cartridges.

The black weighting factor and color weighting factor are set for each print mode, as shown in FIG. 4, and are referred to during the printing procedure shown in FIG. 5 to control the amount of ink to be used for printing.

In S33, the value in the mode number memory 14$a$ is decremented by one (S33), and process returns to S22. When the value of the mode number memory 14$a$ is not zero (S22: NO), an m-th print mode data is retrieved from the print mode memory 15$a$, m being the value stored in the mode number memory 14$a$ (S23) That is, when the print cost for the 50% ink quantity monochromatic mode (monde number: 8) is calculated in S31, the mode number is decremented by one and become 7 (S33). Accordingly, in S23, the seventh print mode data (i.e., 70% ink quantity monochromatic mode) is selected.

As above, for all the print modes of which the print mode data is stored in the print mode memory 15$g$, the print costs are calculated and stored in association with the mode numbers in the print cost memory 14$f$. Thereafter, since the value of the mode number memory 14$a$ becomes zero (S22: YES), the cost estimating procedure is finished, and process proceeds to S2 of the printing procedure shown in FIG. 5.

In S2 (FIG. 5), process determines whether the economical mode is selected. When the economical mode flag 14$g$ is ON (S2: YES), process selects the print mode corresponding to the lowest one of the print costs stored in the print cost memory 14$f$ (S4).

When the economical mode is not selected (S2: NO), process displays the mode numbers and mode names stored in the print mode memory 15$g$ in association with the print costs stored in the print cost memory 14$f$ on the LCD 5 (S3). FIG. 3 shows an example of such an image displayed on the LCD 5. On the screen 5$a$ of the LCD 5, items 5$b$ which represent mode numbers as well as operation numbers, items 5$c$ which represent the mode names and items 5$d$ which represent the print costs for respective modes. The user can determine the optimum mode referring to the display on the screen 5$a$ of the LCD 5. By operating the ten keys 4$d$ corresponding to the number indicated as item 5$b$, the user can select the desired print mode. Further, by inputting zero (0) through the ten keys 4$d$, the user can cancel the printing operation.

Next, process determines whether a mode selection operation is executed (S5). That is, process determines whether one of the operation numbers 5$b$ indicated on the LCD 5 or zero is input through the ten keys 4$b$. When none of the keys have been operated (S5: NO), process waits for an operation of a key by repeating S5. When one of the operation numbers 5$b$ indicated on the LCD 5 or zero is input through the ten keys 4$b$ (S5: YES) or when the economical mode has been selected and process proceeds from S4 to S6, process determines whether the printing operation is cancelled (S6). As described above, when the user inputs zero (0), the printing operation is cancelled. When the printing is cancelled (S6: YES), the printing procedure is finished. When a number other than zero is input through the ten keys 4$d$ (S6: NO), part of the image data stored in the image storage 17 corresponding to the first page is set to the reference page (S7), and the image data of the reference page is retrieved into a predetermined area of the RAM 14 (S8).

Next, in S9, process retrieves the print mode data corresponding to the print mode that is selected in S4 or S5, and determines whether the selected print mode monochromatizes the image (S10). When the monochromatic mode, 70% ink quantity monochromatic mode or 50% ink quantity monochromatic mode shown in table 40 (FIG. 4) is selected, the image will be monochromatized (S10: YES). Thus, in such a case, the image data retrieved in S8 is binarized and monochromatized (S11).

Next, the image data monochromatized (i.e., converted into monochromatic image) in S11 is printed in accordance with the weighting corresponding to the print mode (S12). Specifically, when the user has selected the 70% ink quantity monochromatic mode, since the weighting factor of the black ink is 70%, the quantity of ink for each print dot is reduced to 70% of normal quantity and the printing operation is executed (S13).

When the print mode data corresponding to the print mode selected in S4 or S5 does not require the monochromatization (i.e., normal mode, 70% quantity ink mode, 50% quantity ink mode, 100% black/70% color mode or 100% black/50% color mode) (S10: NO), the retrieved image data is printed in accordance with the black weighting factor and color weighting factor defined by the print mode data corresponding to the selected print mode (S12). For example, when the user has selected the 100% black/70% color mode, the image is printed by the printer 25 such that, for black dot, the quantity of the K (black) ink is similar to the quantity of the normal print, while, for C, M and Y dots, the quantity of each of the C, M and Y ink is 70% of the quantity in the normal printing.

In S14, process determines whether all the pages of the image data stored in the image storage 17 have been retrieved. When all the pages have not been retrieved (S14: NO), the succeeding page is set to be the reference page (S15), and process returns to S8 to retrieve the image of the reference page. When all the pages of image data have been retrieved (S14: YES), the printing procedure shown in FIG. 6 is finished.

Hereinafter, the cartridge price determining procedure and the print mode setting procedure will be described. These procedures are interruption procedures, each of which is executed independently at every predetermined interval.

Figure 7:
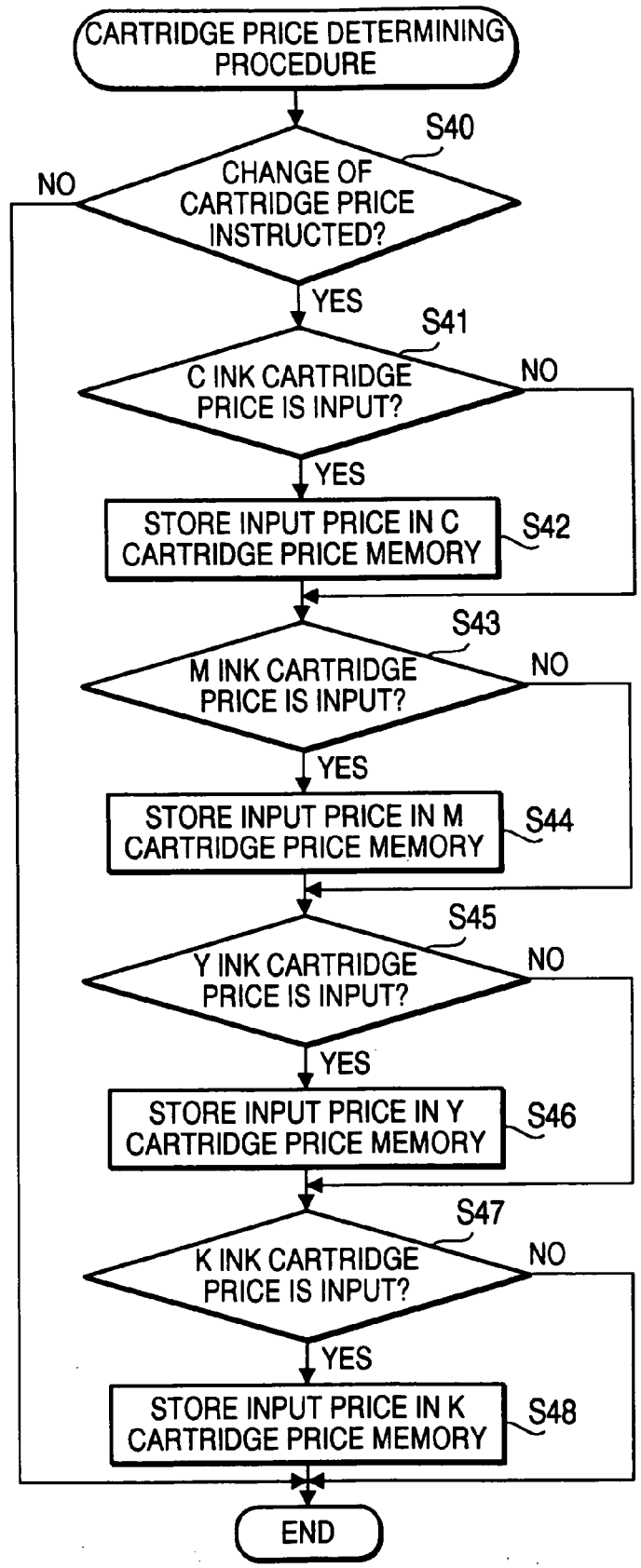
FIG. 7 is a flowchart illustrating a cartridge price determining procedure executed in the MFP.

FIG. 7 shows a flowchart of the cartridge prince determining procedure. According to the embodiment, the user can input the price of a cartridge by depressing a cartridge price input button 4$b$, and then inputting the price through the ten keys 4$d$. Thereafter, when an execution key (not shown) is depressed, the input price of the cartridge is reflected in the memories. As described above, the procedure shown in FIG. 7 is executed at every predetermined interval, and thus, the operation of the execution key is firstly detected. That is, in S40, process determines whether the change of the cartridge price is instructed (by depressing the execution key). When the change of the cartridge price is not instructed (S40: NO), the procedure shown in FIG. 7 is finished. When the change of the cartridge price is instructed (S40: YES), process determines whether the price of the C ink cartridge has been input (S41). When the C ink cartridge price has been input (S41: YES), the input price is stored in the C cartridge price memory 15c (S42), and process proceeds to S43. When the C ink cartridge price has not been input (S41: NO), process proceeds to S43.

In S43, process determines whether the price of the M ink cartridge is input through the ten keys 4d. When the M ink cartridge price has been input (S43: YES), the input price is stored in the M cartridge price memory 15d (S44), and process proceeds to S45. When the M ink cartridge price has not been input (S43: NO), process proceeds to S45.

In S45, process determines whether the price of the Y ink cartridge is input through the ten keys 4d. When the Y ink cartridge price has been input (S45: YES), the input price is stored in the Y cartridge price memory 15e (S46), and process proceeds to S47. When the Y ink cartridge price has not been input (S45: NO), process proceeds to S47.

In S47, process determines whether the price of the K ink cartridge is input through the ten keys 4d. When the K ink cartridge price has been input (S47: YES), the input price is stored in the K cartridge price memory 15f (S48), and the procedure shown in FIG. 7 is finished. When the Y ink cartridge price has not been input (S47: NO), the procedure is finished.

FIG. 8 shows a flowchart of the print mode setting procedure. When the print mode setting procedure is started (as the interruption procedure at every predetermined interval), process determines whether change of the print mode data has been instructed (S60). The change of the print mode data is instructed by depressing the print mode set button 4c.

When the print mode set button 4c has not been depressed (S60: NO), the print mode setting procedure is finished. When the print mode set button 4c has been depressed (S60: YES), since the user has instructed to change the print mode, process retrieves the print mode data corresponding to the mode number to which the mode is to be changed from the print mode memory 15g (S61). Next, process determines whether the mode name is input (S62). Until the mode name is input (S62: NO), process repeats S62. When the mode name is input (S62: YES), process rewrites the mode name of the print mode data retrieved in S61 with the newly input mode name.

In S64, process determines whether the black weighting factor is input. Until the black weighting factor is input (S64: NO), process repeats S64. When the black weighting factor is input (S64: YES), process rewrites the black weighting factor of the print mode data retrieved in S61 with the input value (S65).

In S66, process determines whether the color weighting factor is input. Until the color weighting factor is input (S66: NO), process repeats S66. When the color weighting factor is input (S66: YES), process rewrites the color weighting factor of the print mode data retrieved in S61 with the input value (S65).

Next, process determines whether an update instruction is made by the user (S68). When the updating of the print mode data is instructed (S68: YES), process overwrites the print mode data corresponding to the mode number instructed to be changed with the updated data (S69). When the updating of the print mode is not instructed (S68: NO), the print mode data stored in the print mode memory 15g will not be changed and the print mode setting procedure is finished.

According to this embodiment, the MFP comprises: a consumable substance quantity calculating system that calculates the quantity of consumable substances which is necessary to print a particular image data stored in the image storage 17; a print cost calculating system that calculates a plurality of print costs, each print cost corresponding to each of the plurality of print modes, based on the quantity of the consumable substances calculated by the consumable substance quantity calculating system; a LCD 5 that displays the plurality of print costs calculated by the print cost calculating system, each print cost corresponding to each of the plurality of print modes; a designating system that allows a user to designate one of the plurality of print modes displayed by the LCD 5; and a printer 25 that executes a printing operation of the image data stored in the image storage 17 in the designated print mode. Accordingly, since the plurality of print modes and the plurality of the print costs with each print cost corresponding to each of the plurality of print modes are displayed on the LCD 5, the user can select the optimum print mode from the plurality of print modes easily and quickly.

Further, according to the embodiment, the MFP comprises a print mode data setting system that allows a user to arbitrarily set print mode data stored in the print mode memory 15. Thus, the user can set a print mode arbitrarily. Therefore, the user can set the optimum print mode.

According to the embodiment, the K dot counter memory 14e for storing the number of black print dots and the C dot counter memory 14b, M dot counter memory 14c and Y dot counter memory 14d for storing the numbers of color print dots, and the user sets the weighting factors of black dots and color dots separately. Therefore, when the user can select/set an appropriate print mode. For example, by setting the black and color weighting factors such that the black image is printed clearly while the color image, which may be less clear, is lowered in its quality, the print cost can be reduced with maintaining the minimum desired quality.

According to the embodiment, when the image stored in the image storage 17 includes a plurality of pages of images, the print cost for printing the entire image data is calculated for each print mode. Therefore, user can recognize the total cost necessary for printing the plurality of pages of image data easily.

According to the embodiment, the image storage 17 can store the image data output by the scanner 22. That is, the CPU 12 enables the scanning operation of the scanner 22 while the printer 25 prints images (multi-task function). Therefore, while an image is being printed, an image on the next original can be scanned with the scanner 22, which shorten the time period for printing. Further, since the image storage 17 stores the image data output by the scanner 22, it is not necessary to execute a pre-scanning operation for calculating the print cost. Therefore, the user can know the print costs, select a desired print mode, and executes the printing operation in a short period of time.

According to the MFP 1 described above, by selecting the economical print mode, the print mode proving the least expensive print cost is automatically selected and printing is executed. Such a function is convenient when the user does not care about the quality of the printed image, but intends to select the print mode providing the lowest print cost.

According to the embodiment, the user can input the prices of the ink cartridges any time when necessary. Therefore, the print cost in each print mode can be calculated accurately based on the actual prices of the cartridges. Accordingly, the user can select the optimum print mode from among a plurality of print modes easily.

Further, the invention can be modified in various ways without departing from the scope of the invention.

In the embodiment, when a print mode is selected, based on the black weighting factor and color weighting factor corresponding to the selected print mode, the quantity of the ink for printing each print dot is reduced. The invention may be modified such that, the number of the black dots and color dots are reduced based on the black weighting factor and color weighting factor corresponding to the selected print mode.

It should be noted that, in the embodiment, a printer utilizing ink cartridge is described. It is only an exemplary embodiment, and the invention need not be limited to one having the printer utilizing ink cartridge. The invention can be applied to any other type of printer utilizing consumable substances, such as a laser beam printer or LED printer using toner. In such case, by controlling the surface potential of a photoreceptive drum based on the black and color weighting factors, the quantity of toner to be used can be varied. Of course, when the printer is of a type using the toner, the C, M, Y and K cartridge price memories 15c, 15d, 15e and 15f store the price of toner cartridges.

The present disclosure relates to the subject matter contained in Japanese Patent Application No. 2003-281057, filed on Jul. 28, 2003, which is expressly incorporated herein by reference in its entirety.

What is claimed is:

1. An imaging device capable of printing images in a plurality of print modes, comprising:
   an image storage that stores image data subject to be printed;
   a print mode data storage that stores a plurality of pieces of print mode data corresponding to the plurality of print modes;
   a consumable substance quantity calculating system that calculates the quantity of consumable substances which would be necessary if images are printed in accordance with the image data stored in the image storage;
   a print cost calculating system that calculates a plurality of print costs, each print cost being a cost for printing the image data stored in the image storage in one of a plurality of print modes by the imaging device, each of the plurality of print modes having different quantity of consumable substances, and each print cost being calculated based on the quantity of the consumable substances calculated by the consumable substance quantity calculating system;
   a displaying system that simultaneously displays the plurality of print costs corresponding to the plurality of print modes calculated by the print cost calculating system in association with the plurality of print modes, each print cost being the cost for printing a same image data stored in the image storage in one of the plurality of print modes by the imaging device, and each of the plurality of print modes having the different quantity of consumable substance;
   a designating system that allows a user to designate one of the plurality of print costs displayed by the displaying system; and
   a printing system that executes a printing operation in the designated print cost in accordance with the image data stored in the image storage, the printing system including a printer that prints the image data, the printer being capable of printing the image data in different print modes, the printing system executing printing operations under different print modes using the same printer, wherein:
   each of the print mode data includes weighting factor information defining the quantity of the consumable substances to be used in the corresponding print mode,
   the weighting factor information includes a black dot weighting factor defining the quantity of the consumable substances used for forming black print dots and a color dot weighting factor defining the quantity of the consumable substances used for forming color print dots; and
   the image device further comprises a print mode data setting system that allows a user to arbitrarily input the weighting factor information by inputting the quantity of the consumable substances used for forming black print dots and the quantity of the consumable substances used for forming color print dots, respectively, for each of the plurality of print modes.

2. The imaging device according to claim 1, further comprising a print mode data setting system that allows a user to arbitrarily set the print mode data.

3. The imaging device according to claim 1,
   wherein the image data stored in the image storage includes a plurality of pages of image data,
   wherein the consumable substance quantity calculating system calculates a total quantity of the consumable substances necessary for all of the plurality of pages of image data, and
   wherein the print cost calculating system calculates the print cost for each of the plurality of print modes based on the total quantity calculated by the consumable substance quantity calculating system.

4. The imaging device according to claim 1, further comprising:
   a scanning system that scans an image on an original to output image data, the image data output by the scanning system being stored in the image storage; and
   a scanning control system that controls the scanning system to scan an image while the printing system is executing the printing operation.

5. The imaging device according to claim 1, further comprising a minimum cost selecting system that automatically selects the print mode corresponding to the lowest one of the print costs calculated by the print cost calculating system.

6. The imaging device according to claim 1, wherein the consumable substances are contained in at least one cartridge, and wherein the print cost calculating system calculates the print costs taking the price of the at least one cartridge into account.

7. The imaging device according to claim 1, further comprising a cartridge price inputting system that allows a user to input a price of the at least one cartridge.

8. A non-transitory computer-readable recording medium that stores a control program for controlling a computer to function as an imaging device capable of printing images in a plurality of print modes, the imaging device having functions of:
   an image storage that stores image data subject to be printed;
   a print mode data storage that stores a plurality of pieces of print mode data corresponding to the plurality of print modes;
   a consumable substance quantity calculating system that calculates the quantity of consumable substances which would be necessary if images are printed in accordance with the image data stored in the image storage;
   a print cost calculating system that calculates a plurality of print costs, each print cost being a cost for printing the image data stored in the image storage in one of a plurality of print modes by the imaging device, each of the plurality of print modes having different quantity of consumable substances, and each print cost being calculated based on the quantity of the consumable substances calculated by the consumable substance quantity calculating system;

a displaying system that simultaneously displays the plurality of print costs corresponding to the plurality of print modes calculated by the print cost calculating system in association with the plurality of print modes, each print cost being the cost for printing a same image data stored in the image storage in one of the plurality of print modes by the imaging device, and each of the plurality of print modes having the different quantity of consumable substance;

a designating system that allows a user to designate one of the plurality of print costs displayed by the displaying system; and a printing system that executes a printing operation in the designated print cost in accordance with the image data stored in the image storage, the printing system including a printer that prints the image data, the printer being capable of printing the image data in different print modes, the printing system executing printing operations under different print modes using the same printer, wherein:

each of the print mode data includes weighting factor information defining the quantity of the consumable substances to be used in the corresponding print mode, the weighting factor information includes a black dot weighting factor defining the quantity of the consumable substances used for forming black print dots and a color dot weighting factor defining the quantity of the consumable substances used for forming color print dots; and the image device further comprises a print mode data setting system that allows a user to arbitrarily input the weighting factor information by inputting the quantity of the consumable substances used for forming black print dots and the quantity of the consumable substances used for forming color print dots, respectively, for each of the plurality of print modes.

9. The non-transitory computer-readable recording medium according to claim 8, wherein the imaging device further includes a function of a print mode data setting system that allows a user to arbitrarily set the print mode data.

10. The non-transitory computer-readable recording medium according to claim 8, wherein the image data stored in the image storage include a plurality of pages of image data, wherein the consumable substance quantity calculating system calculates a total quantity of the consumable substances necessary for all of the plurality of pages of image data, and wherein the print cost calculating system calculates the print cost for each of the plurality of print modes based on the total quantity calculated by the consumable substance quantity calculating system.

11. The non-transitory computer-readable recording medium according to claim 8, wherein the imaging device further includes functions of:

a scanning system that scans an image on an original to output image data, the image data output by the scanning system being stored in the image storage; and a scanning control system that controls the scanning system to scan an image while the printing system is executing the printing operation.

12. The non-transitory computer-readable recording medium according to claim 8, wherein the imaging device further includes a function of a minimum cost selecting system that automatically selects the print mode corresponding to the lowest one of the print costs calculated by the print cost calculating system.

13. The non-transitory computer-readable recording medium according to claim 8, wherein the consumable substances are contained in at least one cartridge, wherein the print cost calculating system calculates the print costs taking the price of the at least one cartridge into account; and wherein the imaging device further include a function of a cartridge price inputting system that allows a user to input a price of the at least one cartridge.

* * * * *